(12) United States Patent
Kassin

(10) Patent No.: US 11,959,453 B2
(45) Date of Patent: Apr. 16, 2024

(54) IN-BUILDING IN-PIPE HYDRO-GENERATION SYSTEM

(71) Applicant: Dylan M. Kassin, New York, NY (US)

(72) Inventor: Dylan M. Kassin, New York, NY (US)

( * ) Notice: Subject to any disclaimer, the term of this patent is extended or adjusted under 35 U.S.C. 154(b) by 0 days.

(21) Appl. No.: 17/941,723

(22) Filed: Sep. 9, 2022

(65) Prior Publication Data
US 2024/0084776 A1    Mar. 14, 2024

(51) Int. Cl.
*F03B 17/06* (2006.01)

(52) U.S. Cl.
CPC ...... *F03B 17/062* (2013.01); *F05B 2220/604* (2013.01); *F05B 2260/60* (2013.01); *F05B 2270/3011* (2013.01); *F05B 2270/3013* (2013.01)

(58) Field of Classification Search
CPC .............. F03B 17/062; F05B 2220/602; F05B 2220/604; F05B 2220/60
See application file for complete search history.

(56) References Cited

U.S. PATENT DOCUMENTS

| | | | |
|---|---|---|---|
| 2009/0008943 A1 | 1/2009 | Kemper | |
| 2012/0162973 A1* | 6/2012 | Carter | F21V 33/004 362/193 |
| 2012/0170424 A1* | 7/2012 | Zhou | G04G 9/102 368/10 |

FOREIGN PATENT DOCUMENTS

BR    102018000590 A2  *  7/2019

OTHER PUBLICATIONS

Halifax Water, Energy Recovery From PRVS Using In-Line Turbines, Newfoundland Departement of Environement and Conversation Annual Drinking Water Workshop—Mar. 24, 2015.*
Purdue ECT Team, Lucidpipe Power System, DOI: 10.5703/1288284316353 , https://docs.lib.purdue.edu/cgi/viewcontent.cgi?article=1224&context=ectfs (2016).*
Halifax Water, Energy Recovery from PRVs Using In-Line Turbines; Newfoundland Department of Environment and Conservation Annual Drinking Water Workshop, Mar. 24, 2015, 43 pages.
International Search Report and Written Opinion, PCT/US23/32358, dated Nov. 20, 2023, 10 pages.

* cited by examiner

*Primary Examiner* — Kenneth Bomberg
*Assistant Examiner* — Daniel S Collins
(74) *Attorney, Agent, or Firm* — Blank Rome LLP

(57) ABSTRACT

The utilization of hydro-generation technology is provisioned inside of water distribution systems within large urban buildings that require water pressure reduction. These micro-hydro-generators reduce the water pressure for tenant use and converts the energy into electricity to be used or sold.

11 Claims, 6 Drawing Sheets

IN-BUILDING IN-PIPE HYDRO-GENERATION SYSTEM

BACKGROUND

The disclosure relates generally to using pre-existing micro-hydro-generation to collect electricity. Hydro-generators derive energy from the flow of water, and can range in size from large (e.g., for use with dams) to medium (e.g., private farms), to micro-sized, which is a small hydro-generator. Hydroelectricity refers to the production of electricity from hydropower. A hydro-electric generator, or hydrogenator, converts water flow to electricity, and includes a water turbine or hydro-turbine coupled to a generator. U.S. Patent Publ. No. 2009/0008943 to Kemper shows a residential hydroelectric generator. Kemper states that a hydrogenator is attached to the intake of water from a water main into the individual residential water system.

Pressure reducing valves (PRVs) have been used in urban building water distribution systems to decrease the pressure required to distribute the water to a pressure that would allow the water to be safely used through one or more water appliances, e.g., a faucet, water heater, shower, toilet dishwasher, etc. These PRVs have even been installed within buildings that use the water-tower method of water distribution in the water's journey from the water tower to tenants. With the advent of skyscrapers and urban buildings with more than ten floors, the use of PRVs has even replaced the use of water towers in most new buildings and developments.

FIG. 1(a) shows an example of one such water distribution system 5 in a five-floor building. As shown, water comes into the system 5 via a water main pipe or pipeline 7 that connects to a watermain in the street, and a building water pressure pump 9, usually located in a basement of the building. One or more primary building water pipes or pipelines 11 extend from the pump 9 upward to the top floor of the building. One or more secondary water pipes or pipelines 13 are separately connected to the primary pipeline 11. As shown, there may be multiple secondary pipelines 13 connected to the primary pipeline 11 at each floor of the building. As shown in FIG. 1(b), each secondary pipeline 13 can connect to a different building unit (e.g., room or apartment), or more than one building unit. Or, more than one secondary pipeline 13 can connect to a single building unit.

A PRV 15 is positioned at each secondary pipeline 13. The PRV 15 has an input connected to the secondary pipeline 13 and an outlet that goes to the one or more water appliances at the building unit(s).

Essentially, for the water to reach tenants at all floors with an adequate pressure, when water enters the building, it is pumped to an extremely high pressure from the pump 9 in the basement of the building, to a level where when it reaches units on the top floor the water would have enough pressure to be used. However, if this same water were to be siphoned off to any of the units below the top floor, the pressure would be too high and would subsequently break faucets, showers, etc. Thus, the PRVs 15 are used on every floor or every few floors (depending on building occupancy and size) to decrease the pressure to usable and safe levels. These PRVs 15 reduce the pressure of the water by converting the energy stored as pressure into heat 17 that is dissipating from the PRV 15. This essentially wastes the energy that was stored in the water as pressure.

SUMMARY

The utilization of hydro-generation technology is provisioned inside of water distribution systems within large urban buildings that require water pressure reduction. These micro-hydro-generators reduce the water pressure for tenant use and converts the energy into electricity to be used or sold.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

Figure 1A:
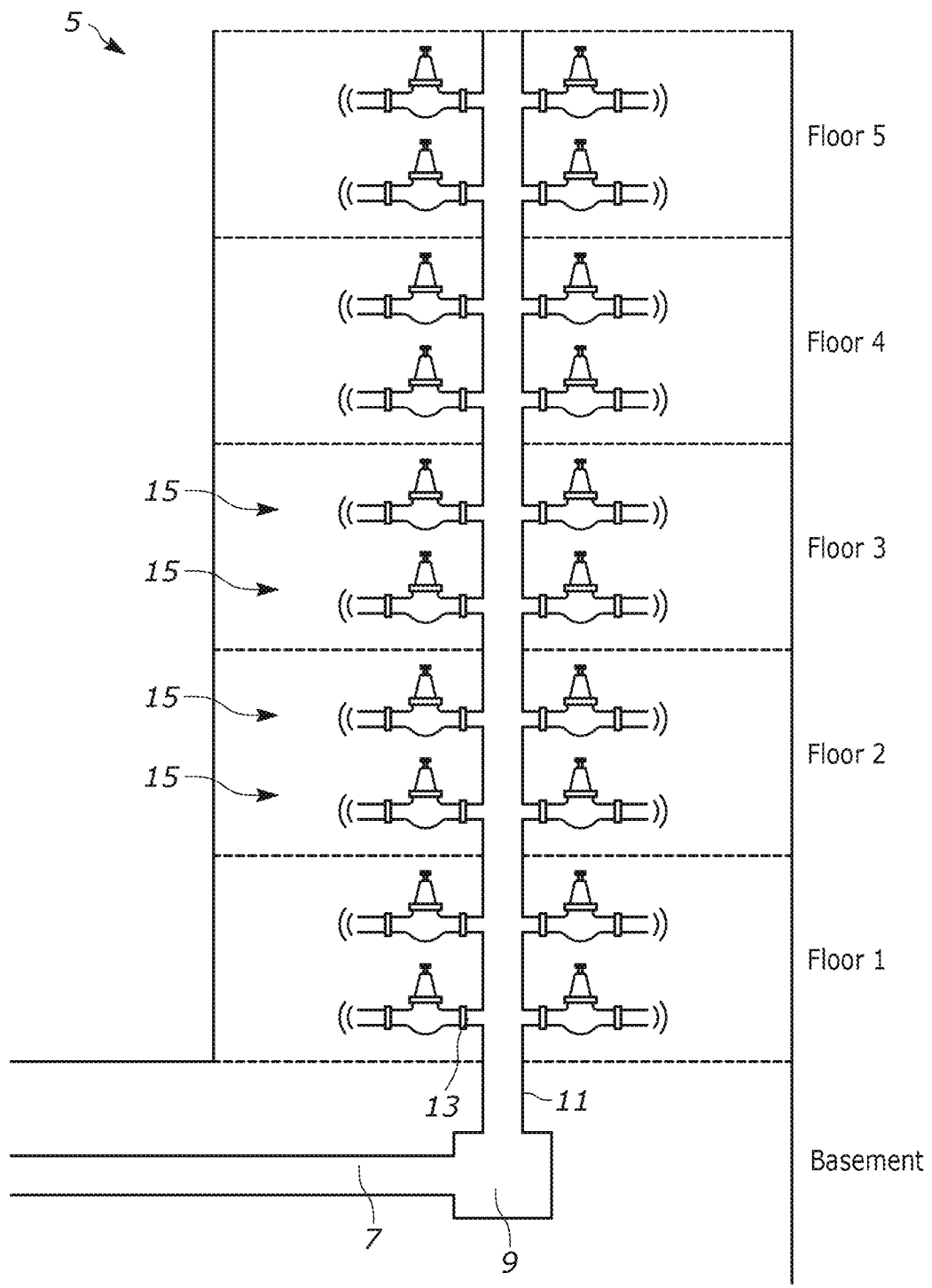
FIGS. 1(a), 1(b) are plan views of a building have a conventional PRV water distribution systems.
Figure 1B:
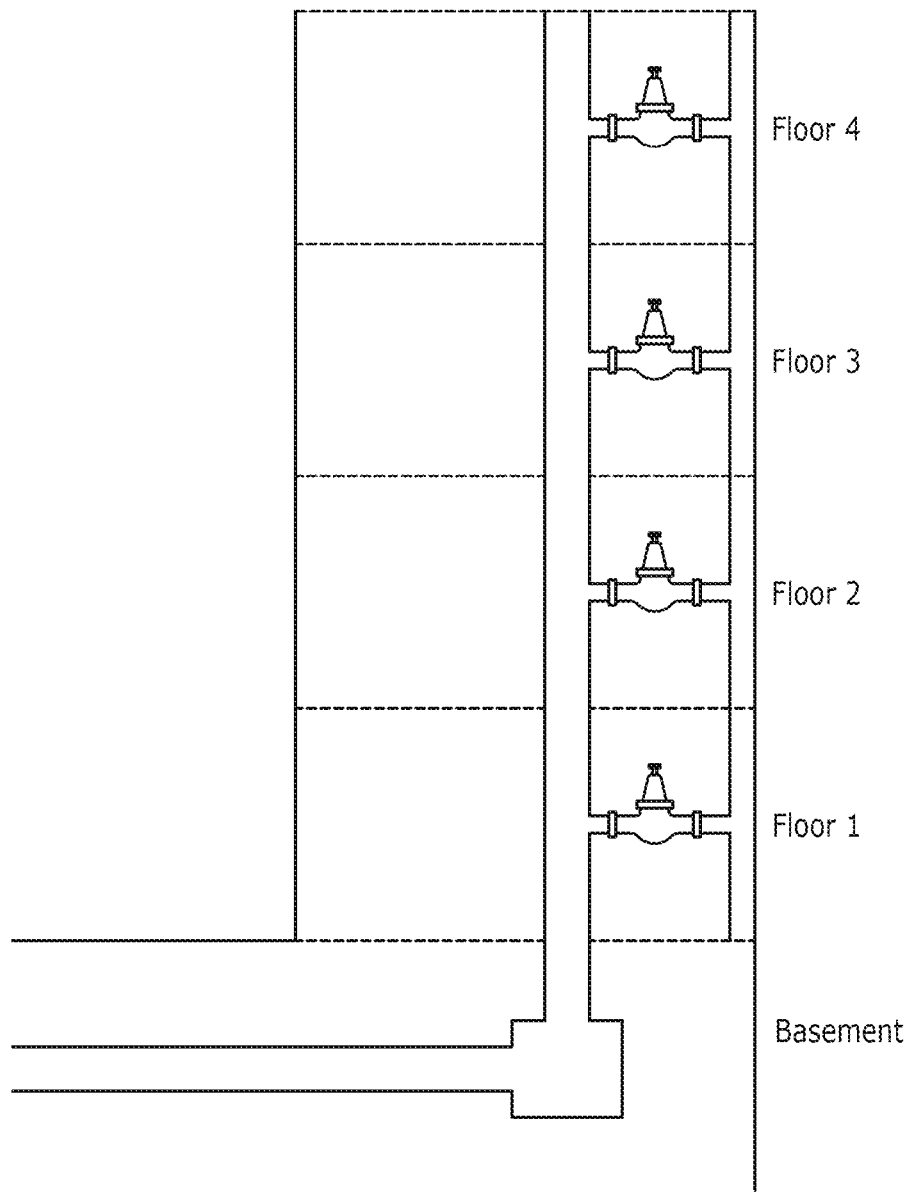

The figures show one illustrative embodiment of the present disclosure. Other embodiments can have components of different scale. Like numbers used in the figures may be used to refer to like components. However, the use of a number to refer to a component or step in a given figure has a same structure or function when used in another figure labeled with the same number, except as otherwise noted.

DETAILED DESCRIPTION

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Figure 2:
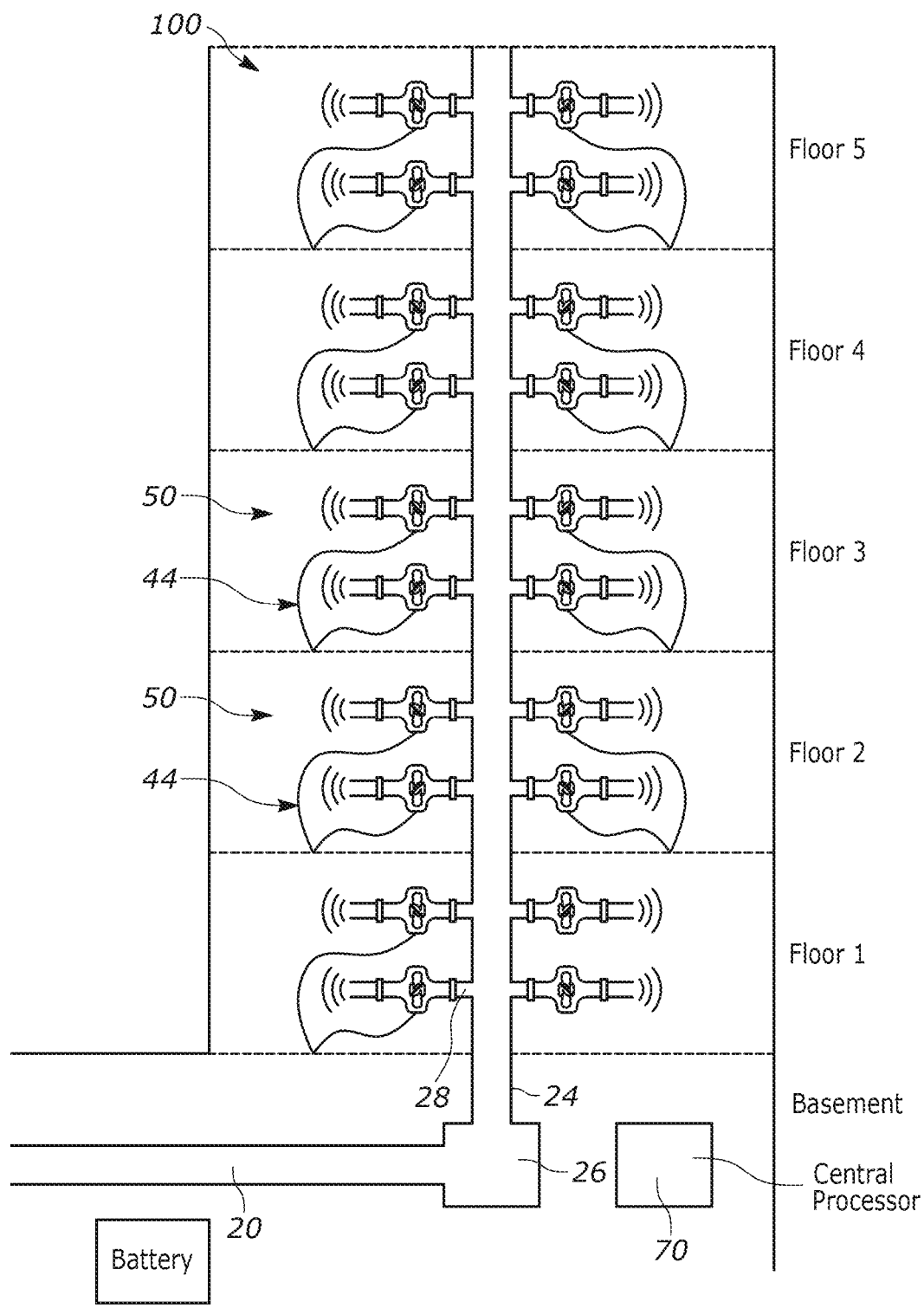
FIG. 2 is a plan view of a building have a hydro-electric generation system in accordance with one example of the present disclosure.

Turning to the drawings, FIG. 2 shows a hydro-electric generation system 100 in accordance with one example embodiment of the present disclosure. The system 100 is shown in a closed water delivery system, here a building with five floors, though any suitable number of floors can be provided, greater or fewer than five. As shown, water comes into the system 100 via a main water pipe or pipeline 20 that connects to a watermain in the street, and a building water pressure pump 26, usually located in a basement of the building. One or more primary building water pipes or pipelines 24 extend from the pump 26 upward to the top floor of the building. One or more secondary water pipes or pipelines 28 are separately connected to the primary pipeline 24. As shown, there may be multiple secondary pipelines 28 connected to the primary pipeline 24 at each floor of the building. Each secondary pipeline 28 can connect to a different building unit (e.g., room or apartment), or more than one building unit. Or, more than one secondary pipeline 28 can connect to a single building unit.

The system 100 includes a plurality of electric generator apparatus 50 positioned about a building. The generator apparatus 50 can be considered as a micro-hydro generator. That is, in some embodiments, the generator apparatus 50 is attached after the water pump 26 within a residential or commercial water system which collects the water from the water main into the unit's individual water system as opposed to directly from the water main.

An electric generator apparatus 50 is positioned at each secondary pipeline 28. The generator apparatus 50 has an input connected to the secondary pipeline 28 and an outlet that goes to the one or more water appliances at the building unit(s). Though one generator apparatus is shown for each secondary pipeline 28, more than one generator apparatus 50 can be connected to each secondary pipeline 28.

Figure 3A:
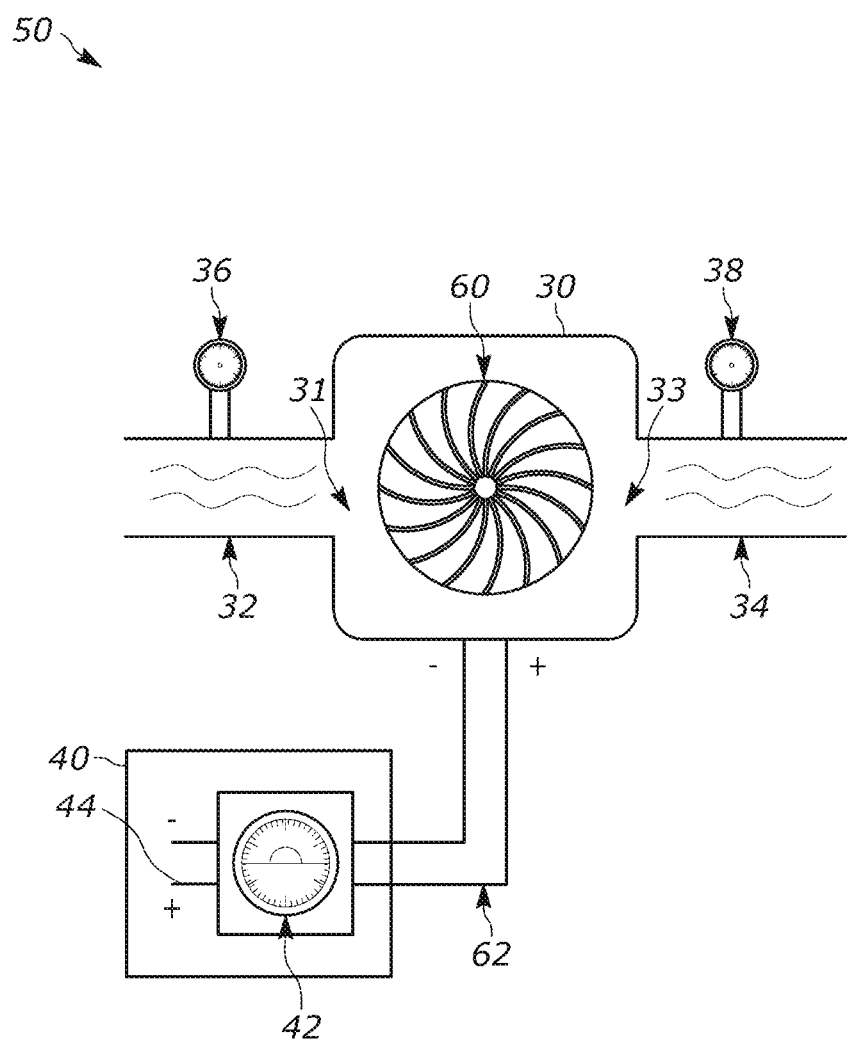
FIG. 3(a) is a block diagram of an exemplary hydro-electric generation system according to one example of the present disclosure.
Figure 3B:
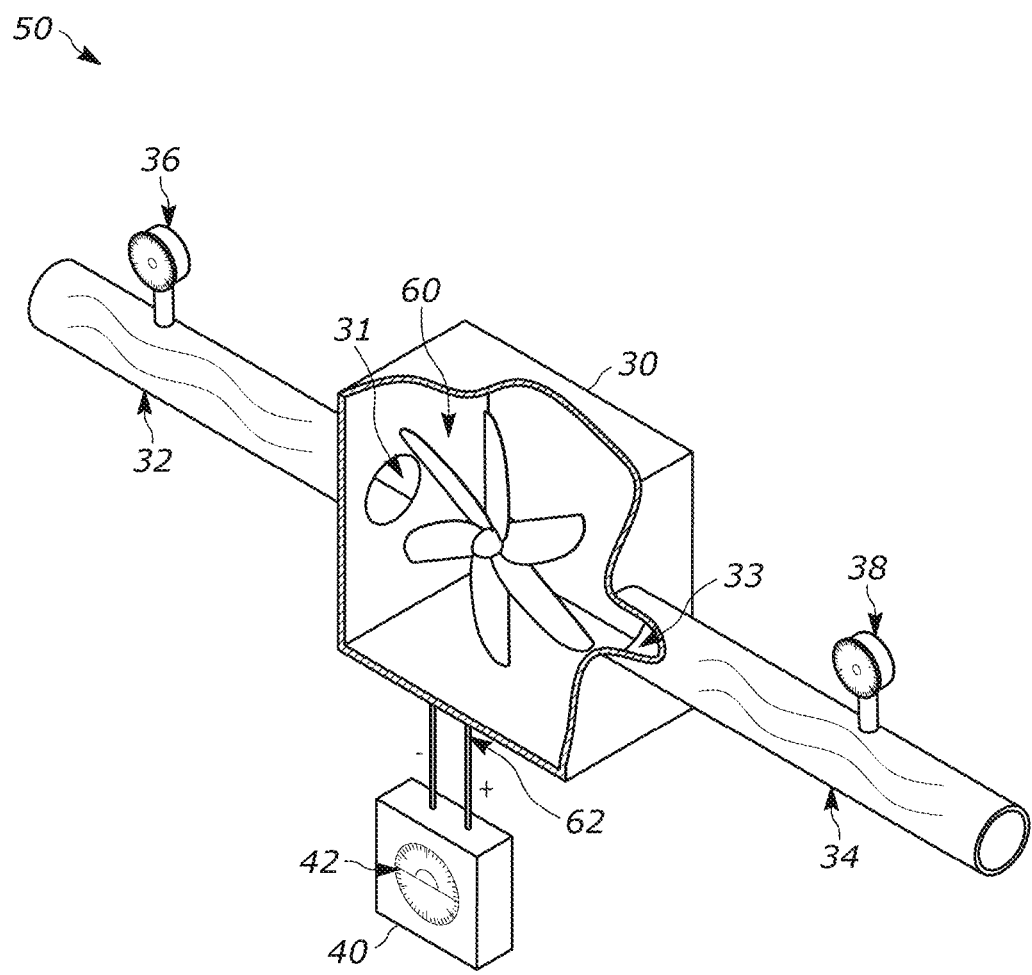
FIG. 3(b) is a cross-sectional exposed view of the hydro-electric generation system of FIG. 3(a)

Turning to FIGS. 3(a), 3(b), each generator apparatus 50 includes a generator housing or body 30, inlet port or inlet 31, inlet water pipe 32, outlet port or outlet 33, outlet water pipe 34, inlet water pressure sensor or measurement device 36, outlet water pressure sensor or measurement device 38, electric generator or turbine 60, electric leads 62, and electricity production sensor or measurement device 42. Though the hydro-electric generator (also referred to as a hydro-generator) is described to be a turbine 60, it will be apparent that any suitable component or equipment can be utilized that converts liquid (or gas or solid) flow to electricity. In the example embodiments shown and described here, the generator apparatus 50 is a micro generator that is suitable for use with the water pressures at the inlet and outlet of the housing.

The housing or body 30 has an inlet 31, such as for example an inlet opening, at an inlet side of the housing 30 and an outlet 33, such as for example an outlet opening, at an outlet side of the housing 30, which can be opposite the inlet side of the housing 30. The inlet water pipe 32 is connected at the inlet 31 and can be integral with the generator body 30. In some embodiments, the inlet 31 can be an opening and the inlet pipe 32 can be a separate pipe that is connected to the generator body 30 such as for example by an external male thread that engages a female threaded inlet opening at housing 30. In certain embodiments, the inlet pipe 32 is a pipe that extends outwardly from the housing 30. In other embodiments, the inlet 31 opening can directly connect to the secondary building water pipe 28, such as for example the inlet 31 can be an internal female threaded opening at the housing 30 that threadably connects with an external male threaded secondary pipe 28.

Thus, the inlet water pipe 32 is connected to a water source, here a building secondary water pipe 28 (FIG. 2); or the inlet water pipe 32 can be the secondary water pipe 28 that connects directly to the inlet 31. The building secondary pipe 28 connects (directly or indirectly) to a street water main, and receives inlet water from the water source. The inlet water from the secondary pipe 28 is under high pressure, usually created by a centrally located pump 26 in the basement of the building.

The outlet water pipe 34 is connected at the outlet 33 and can be integral with the generator body 30. In some embodiments, the outlet 33 can be an opening and the outlet pipe 34 can be a separate pipe that is connected to the generator body 30 such as for example by an external male thread that engages an internal female threaded inlet opening at the housing 30. In certain embodiments, the outlet pipe 34 is a pipe that extends outwardly from the housing 30. In other embodiments, the outlet 33 opening can directly connect to the building or appliance water pipe, such as for example the outlet 33 can be an internal female threaded opening at the housing that threadably connects with an external male threaded building or appliance pipe.

Accordingly, the inlet 31 is in fluid communication with the inlet pipe 32 and the interior space of the housing 30. The outlet is in fluid communication with the inlet 31 and the interior space of the housing 30, and in fluid communication with the outlet pipe 34. And the turbine 60 is in fluid communication with the inlet 31, inlet pipe 32, outlet 33, and outlet pipe 34, positioned between the inlet 31 and the outlet 33.

The inlet pressure measurement device 36 is connected to the inlet water pipe 32 and provides a real time measurement of the water pressure inside the inlet water pipe 32. In other embodiments, the inlet pressure measurement device 36 can be connected to the secondary building pipe 28, which is attached to the inlet 31.

The outlet pressure measurement device 38 is connected to the outlet water pipe 34 and provides a real time measurement of the outlet water pressure inside the outlet water pipe 34. In other embodiments, the inlet pressure measurement device 36 can be connected to the building or appliance pipe, which is attached to the outlet 33.

The body 30 forms a complete fluid-tight enclosure (when the inlet and outlet 31, 33 are coupled to respective pipes) having an interior space, and the hydroelectric generator turbine 60 is fully enclosed in the interior space of the generator body 30. The turbine 60 is rotated by the flow of water as it passes from the water inlet pipe 32, through the inlet 31, through the body 30 and past the turbine 60, to the water outlet 33 and into the water outlet pipe 34. That rotation of the turbine 60 generates electricity, which is passed out of the generator body 30 via the electric leads 62. The leads 62 carry the electricity from the hydroelectric generator turbine 60 to the electricity production measurement device 42. The electricity production measurement device 42 measures or senses the amount of electricity that is produced by the turbine 60 in real time and outputs the electricity production measurement. The generated electricity on the output leads 62 can also be connected to a central battery/electricity storage system for the building or floor, either directly from the leads 62 to the battery or for example via electric leads 44. That generated electricity can be stored at the power storage system for use by the building or floor.

The electricity production measurement device 42 can be located at a processing device such as a computer, that engages fault-safety measures. The processing device 40 is in wired or wireless communication with the inlet water pressure sensor 36, the outlet water pressure sensor 38, the turbine 60, and/or the electricity production sensor 42. The processing device 40 receives the inlet water pressure measurement from the inlet sensor 36 and the outlet water pressure measurement from the outlet sensor 38. The processing device 40 also receives the electricity production measurement from the electricity production measurement sensor 42. The processing device 40 analyzes the inlet pressure measurement, outlet pressure measurement and/or the electricity production measurement to determine if the generator apparatus 50 is performing correctly. The processing device 40 includes a fault-safe mechanism that allows water to simply run through the generator apparatus 50 in the event the processor 40 detects a malfunction. The processing device 40 can also generate an alert or alarm to indicate the malfunction.

The processing device 40 monitors performance and alerts the owner of performance or malfunction as well as to run faulty-safe measures in case of a malfunction to avoid any damage. In addition, the processing device 40 generates a control signal that is sent to the turbine 60 to control operation of the turbine 60. For example, the processing device 40 can maintain, raise or lower the resistance of the turbine 60, and stop or start the turbine 60.

Normal ranges for electricity production and pressure levels will vary from device to device depending on which floor it is installed. This calculation can be completed for each potential customer prior to installation and stored at a memory associated with the processing device 40. Potential malfunctions include the turbine dropping in efficiency (based on the inlet pressure and the amount of electricity generated) due to some mechanical maintenance need. The processing device 40 generates an alarm when the sensors detect production or pressure rates below the set customized range (set in calculations completed prior to each customer installation).

For example, the processing device 40 receives the amount of electricity that has been generated by the turbine 60, from the electricity measurement device 40. It also receives the inlet pressure from the inlet pressure sensor 36. Based on those two values, the processing device 40 can determine the efficiency of the turbine 60 to determine if the turbine 60 is operating efficiently or not. If the turbine 60 is not efficient, it can send an alert or otherwise indicate that maintenance is needed on the turbine 60.

The water appliances (e.g., faucet, dishwasher, toilet) can only tolerate a substantially lower water pressure than the pressure present at the building pipes 24, 28. Thus, the water pressure at the inlet 31 and inlet pipe 32 (or building pipe 28) is much greater than the water pressure at the outlet 33 and outlet pipe 32 (or appliance or appliance pipe). Accordingly, the generator apparatus 50 reduces the pressure from the inlet 31 to the outlet 33. More specifically, the turbine 60 reduces the pressure. As the water passing through the housing 30 rotates the turbine 60, the pressure is reduced from the inlet 31 to the outlet 33. The turbine 60 not only reduces pressure, but also simultaneously generates energy that is captured into electricity by the turbine 60.

The turbine 60 can be set to reduce the water pressure to a desired water pressure (e.g., a pressure that is suitable for the building water appliances). Thus, for instance, the generators 50 at the lower levels of the building may have a higher water pressure at the inlet 31 and therefore need to reduce the pressure a greater amount than generators 50 at the higher floors of the building, where the pressure at the inlet 31 is lower than the pressure at the inlet 31 for the lower floors. Thus, the generators 50 at the lower building floors generate more electricity than the generators 50 at the higher building floors. The amount of pressure reduction can be controlled by the processing device 40. The processing device 40 receives the water pressure value from the inlet water pressure detector 36 and/or the outlet water pressure detector 38 and dynamically adjusts the resistance of the turbine 60 in real time accordingly. Accordingly, the processing device 40 operates in real time to dynamically account for any pressure variation at the inlet 31, and any lower pressure sensed at the outlet 33 to avoid low or high-water pressure at the outlet 33. The processing device 40 sends a control signal to the turbine 60 to control operation of the turbine 60, such as to turn the turbine on, off, maintain or adjust the resistance of the turbine 60.

For example, the outlet pressure sensor 38 may detect a high or low pressure due to fluctuations in water usage at the building unit. The processor 40 detects the high or low pressure reading from the outlet water pressure sensor 38 in real time, and dynamically adjusts (maintains, raises or lowers) the turbine 60 resistance to lower or raise the pressure at the outlet 33, respectively, until a desired outlet pressure is obtained at the outlet sensor. In another example, the inlet pressure sensor 36 may detect a high or low pressure due to fluctuations of the building pump 26 or fluctuations in water usage at the other floors or units. The processor 40 detects the high or low pressure reading from the inlet water pressure sensor 36 in real time, and dynamically adjusts (maintains, raises or lowers) the turbine 60 resistance to lower or raise the pressure at the outlet 33, respectively.

Though both an inlet and outlet pressure sensor 36, 38 are described, in certain embodiments the system 100 can only use a single sensor, either the inlet sensor 36 or the outlet sensor 38, and the processor 40 adjusts the turbine 60 based on the pressure reading of that single sensor. The higher the turbine 60 resistance, the more electricity that is generated by the generator apparatus 50. For example, if the processor reads a lower electric production value than the range calculations indicate should be produced, the processor will activate an alert that alerts maintenance teams to the issue. The alert can be transmitted to the maintenance team (such as to a processing device such as a smart phone), and/or the alert can activate a local alarm that is sounded.

Thus, in certain embodiments, the generator apparatus 50 manages the internal water pressure, thereby replacing the conventional Pressure Reducing Valves (PRV) so that no PRV is needed in the system 50. The novel elements are the pressure measuring device 36, 38 and the electricity production measuring system 42 and processor 40. However, instead of dissipating the extracted pressure into heat (as a PRV does), the generator apparatus 50 produces electricity. That is, the generator apparatus 50 captures energy that is otherwise lost by a conventional PRV.

The system 100 is a closed water delivery system. That is, the system 100 is closed from the inlet 31 to the outlet 34, and moreover from the inlet pipe 32 to the outlet pipe 34, and moreover from the building pump 26 to the building appliance, and moreover from the street water main pipe 20 through the building pressure pump 26, the building main pipe 24, secondary pipe 28, generator apparatus 60, to the building water appliance.

The system 100 produces clean energy in the heart of urban centers both producing enormous amounts of clean energy and mitigating the issue of transmission in the future of expanding renewable energy, and mitigating power outages in low-income urban neighborhoods. It does all this while providing the building owner with cost savings.

In some embodiments, one especially beneficial scenario is use within buildings taller than 10 stories as that provides enough potential energy for significant returns though the generator apparatus 50 can be used in any size building. The available energy for a turbine to capture is dependent on the pressure level to which the water is pumped to reach the highest floor. This pressure is most prevalent in buildings over about 10 stories to produce substantial generation of electricity; though electricity can be generated for buildings having any number of floors, even a single floor.

The system 100 utilizes micro-hydro-generators 50 to be installed in place of PRVs to reduce the pressure of the incoming water to units; though in some embodiments the generators can be installed together with a PRV. Unlike PRVs, the micro-hydro-generators 50 convert the energy stored in the water as pressure into electricity to be used or sold. Building owners could either use the electricity towards their cost-savings or sell the electricity back to the grid. This produces clean energy and an alternative revenue source/cost-savings for building owners. Additionally, urban areas are often the most affected by forced blackouts or power outages due to their often far distance from where the power they consumed is sourced. This solution would turn the heart of urban areas into clean energy production hubs. While the energy produced might not completely supplement the power lost from the outage for long-periods of time, it would play a vital role in ensuring emergency services and necessary institutions could remain with power.

Because of the variance in building size, occupancy, local water pressure rates, and more variables that depends on each client, there is no one set of dimensions or micro-hydro-generators 50. Additionally, the number of micro-hydro-generators to be installed in one building would vary and correspond to the number of PRVs installed in the buildings. However, in some examples, the inlet and outlet connections 1, 2 can range from 3-inches in circumference to 12-inches in circumference, or approximately 0.95-3.82 inches in diameter. Fasteners, such as mounting screws would be placed along the connections to the pipes. The fastening element is attached to the generator body 30, which houses the turbine 5 and the electrical connections to the turbine. The entire generator apparatus 50 can be less than about 8-cubic-feet. The generators would likely use Kaplan or Francis turbines 5 depending on what would work best with each building's specifications.

The generator apparatus 50 (including the body 30, input 31, outlet 33, input pipe 32, outlet pipe 34, sensors 36, 38, leads 62, processor 40 and sensor 42) can be pre-assembled, then delivered on-site for installation, such as through welding the inlet and outlet to the existing pipe of the building or just using crude screws, or other connections such as threaded engagement.

It should be noted that the computer 40, electricity measuring 42 and pressure measuring devices 36, 38 are optional, and the generator apparatus 50 need not include those components. That is, the generator apparatus 50 can essentially comprise a turbine 60 that reduces the pressure from the inlet 31 to the outlet 33. In addition, the computer 40 need not conduct fault-safe monitoring. Thus, the generator apparatus 50 can generate electricity and reduce the pressure from the inlet 31 to the outlet 33, without the monitoring provided by the sensors 36, 38, 42 and computer 40.

In the embodiment of FIGS. 3(*a*), 3(*b*), the processing device 40 is located near or at the generator housing 30. In addition, the inlet and outlet sensors 36, 38 are located as close to the inlet 31 and outlet 33 of the generator housing 30 to get the most accurate pressure measurements. In still further embodiments of the disclosure, the processing device 40 can be in wired or wireless communication with a central processing device 70 (FIG. 2) that is remote from the generator housing 30 at a central location in the building. Or, a single central processing device 70 can be provided that is remote from the generator housings 30 at a central location in the building, without any processing device 40 located at the generator apparatus 50. The central processing device receives signals from multiple generators 50 and controls operation of the turbines 60 at multiple generators 50 located throughout the building. Thus, the central processing device can detect a pressure spike at an input detector 36 of a first generator located at a lower floor of the building, and adjust the turbines 60 at multiple other generators located at higher floors of the building in advance of the spike reaching those generators. Or, the central processing device can detect lower pressure levels at input or outlet sensors 36, 38 of generators at the higher floors, and adjust the turbines 60 at the lower floors to help raise the pressure at the higher floors.

Figure 4:
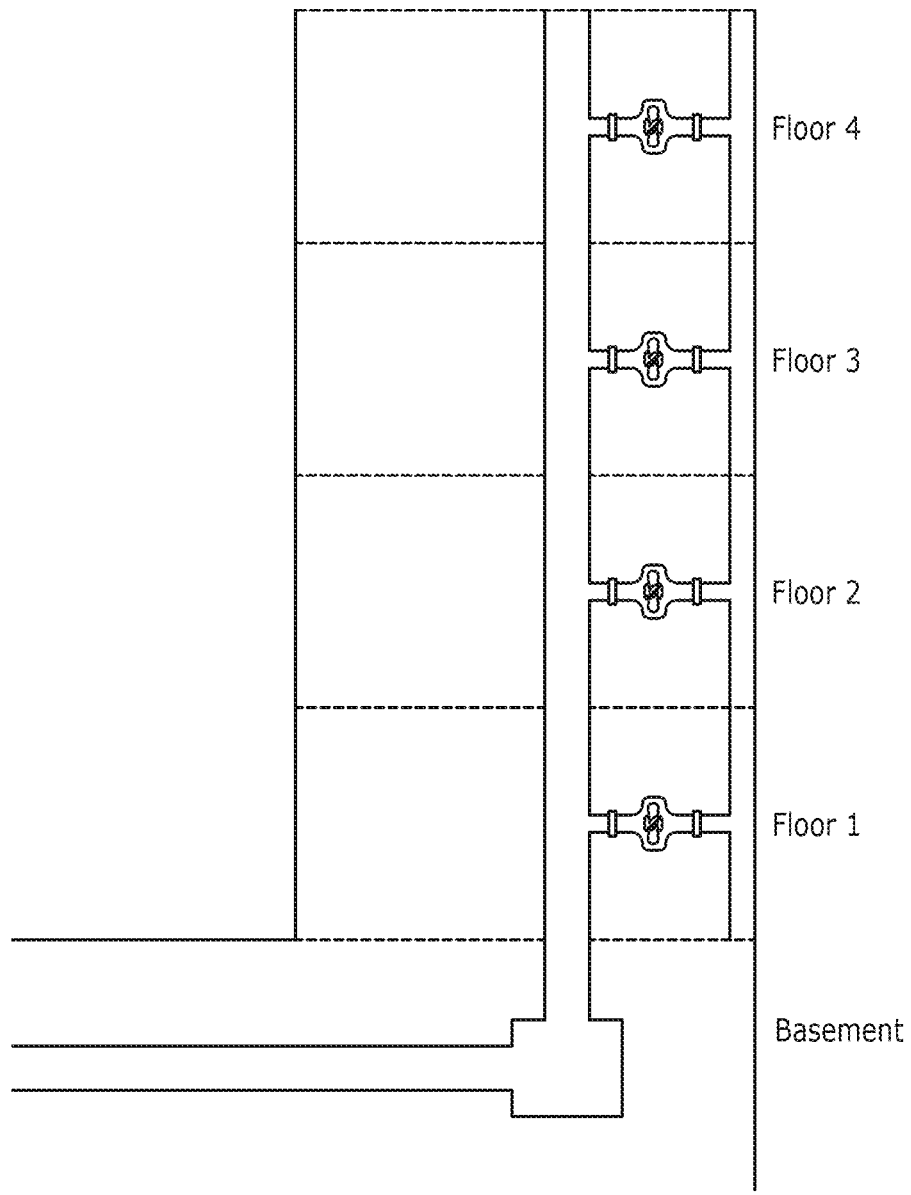
FIG. 4 is a plan diagram of an additional embodiment of the hydro-electric generation system implemented in a building.

FIG. 4 shows another embodiment of the system, wherein a single micro-generator is provided for each floor, and the water output can be fed to one or multiple apartments or building units. This differs from FIG. 2, where a single micro-generator is provided for each apartment or building unit. Still other configurations of the system can be provided within the spirit and scope of the present disclosure.

The inlet pressure completely varies based on building size. However, in certain embodiments, the inlet pressure can exceed 5.5 MPa (Mega-Pascals) and outlet pressure often hovers around 0.3 MPa.

The processing device 40 and central processing device 70 can each be, for instance, a computer, personal computer (PC), server or mainframe computer, or more generally a computing device, processor, application specific integrated circuits (ASIC), or controller. The processing device can be provided with one or more of a wide variety of components or subsystems including, for example, wired or wireless communication links, input devices (such as touch screen, keyboard, mouse) for user control or input, monitors for displaying information to the user, and/or storage device(s) such as memory, RAM, ROM, DVD, CD-ROM, analog or digital memory, flash drive, database, computer-readable media, and/or hard drive/disks. All or parts of the system, processes, and/or data utilized in the system of the disclosure can be stored on or read from the storage device(s). The storage device(s) can have stored thereon machine executable instructions for performing the processes of the disclosure. The processing device can execute software that can be stored on the storage device. Unless indicated otherwise, the process is preferably implemented in automatically by the processor substantially in real time without delay.

It is further noted that the system 100 is described for use with water distribution systems. However, it can be used with any similar type of system, and need not be liquid but can be gas or solid, and need not be water, such as for example oil distribution, gas distribution (e.g., natural or propane gas), or other. In addition, though an electric generator apparatus 50 is provided, it will be recognized that any generator can be provided to generate any form of power or energy.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

What is claimed is:
1. A hydro-electric generation system, comprising:
   a first hydro-electric generation apparatus comprising:
      a first housing having a first inlet in fluid communication with a fluid source, said first inlet having a first inlet fluid pressure, said first housing further having a first outlet in fluid communication with the first inlet, said first outlet having a first outlet fluid pressure;
      a first power generator positioned in said first housing between the first inlet and the first outlet and in fluid communication with a first fluid flow passing from the first inlet to the first outlet through said first housing, and configured to convert the first fluid flow to electric and reduce the first inlet fluid pressure at said first inlet to the first outlet fluid pressure at said first outlet;

a first pressure sensor positioned at the first outlet of said first housing and configured to detect a first detected outlet pressure at the first outlet;

a second hydro-electric generation apparatus comprising:

a second housing having a second inlet in fluid communication with the fluid source, said second inlet having a second inlet fluid pressure, said second housing further having a second outlet in fluid communication with the second inlet, said second outlet having a second outlet fluid pressure;

a second power generator positioned in said second housing between the second inlet and the second outlet and in fluid communication with a second fluid flow passing from the second inlet to the second outlet through said second housing, and configured to convert the second fluid flow to electric and reduce the second inlet fluid pressure at said second inlet to the second outlet fluid pressure at said second outlet;

a second pressure sensor positioned at the second outlet of said second housing and configured to detect a second detected outlet pressure at the second outlet; and a central processing device configured to receive the first detected outlet pressure and the second detected outlet pressure, control operation of said first and/or second power generator based on the first detected outlet pressure and the second detected outlet pressure.

2. The hydro-electric generation system of claim 1, wherein the fluid comprises water.

3. The hydro-electric generation system of claim 1, wherein said first outlet and/or said second outlet is in flow communication with a low-pressure water appliance that operates at the second fluid pressure lower than the first fluid pressure.

4. The hydro-electric generation system of claim 1, wherein said central processing device configured to receive the first detected outlet pressure, and control operation of said first power generator based on the detected outlet fluid pressure to achieve a first desired outlet pressure, and receive the second detected outlet pressure and control operation of said second power generator based on the detected outlet fluid pressure to achieve a second desired outlet pressure.

5. The hydro-electric generation system of claim 1, a first inlet sensor coupled at said first inlet and configured to detect the first inlet fluid pressure;

a second inlet sensor coupled at said second inlet and configured to detect the first inlet fluid pressure; and said central processing device configured to receive the detected first inlet fluid pressure and control operation of said first power generator based on the detected first inlet fluid pressure, and receive the detected second inlet fluid pressure and control operation of said second power generator based on the detected second inlet fluid pressure.

6. The hydro-electric generation system of claim 1, further comprising a first electricity production measurement device connected to said first power generator and configured to detect a first amount of electricity generated by said first power generator, and a second electricity production measurement device connected to said second power generator and configured to detect a second amount of electricity generated by said second power generator.

7. The hydro-electric generation system of claim 6, said central processing device configured to receive the detected first amount of electricity from said first electricity production measurement device and control operation of said first power generator based on the detected first amount of electricity, and receive the detected second amount of electricity from said second electricity production measurement device and control operation of said second power generator based on the detected second amount of electricity.

8. The hydro-electric generation system of claim 1 wherein said first hydro-electric generation apparatus is at a first floor of a building and said second hydro-electric generation apparatus is at a second floor of a building different than the first floor.

9. The hydro-electric generation system of claim 1, further comprising:

a first outlet sensor coupled at said first outlet and configured to detect the first outlet fluid pressure;

a first processing device in communication with said first outlet sensor and configured to adjust the first hydro-electric generator based on the detected first outlet fluid pressure;

a second outlet sensor coupled at said second outlet and configured to detect the second outlet fluid pressure; and a second processing device in communication with said second outlet sensor and configured to adjust the hydro-electric generator based on the detected second outlet fluid pressure.

10. The hydro-electric generation system of claim 9, said central processor in communication with said first and second processing devices and configured to control operation of said first and second power generators based on information detected at any of the plurality of hydro-electric generation systems.

11. The system of claim 1, wherein each of said first and second hydro-electric generation apparatus replaces a pressure-reducing valve, such that the system has no pressure-reducing valve.

* * * * *